United States Patent [19]

Schaeffer et al.

[11] Patent Number: 4,529,232
[45] Date of Patent: Jul. 16, 1985

[54] CYLINDER OR BARREL FLANGE CONNECTION

[75] Inventors: Hans-Joachim Schaeffer, Laatzen; Gerhard Syrbius, Grossburgwedel, both of Fed. Rep. of Germany

[73] Assignee: Hermann Berstorff Maschinenbau GmbH, Hanover, Fed. Rep. of Germany

[21] Appl. No.: 525,711

[22] Filed: Aug. 23, 1983

[30] Foreign Application Priority Data

Aug. 26, 1982 [EP] European Pat. Off. ........ 82107839.1

[51] Int. Cl.³ ............................................. F16L 23/00
[52] U.S. Cl. ..................................... 285/415; 403/336
[58] Field of Search .............. 403/356, 358, 336, 337, 403/344, 309, 310; 285/413, 414, 415

[56] References Cited

U.S. PATENT DOCUMENTS

| | | | |
|---|---|---|---|
| 1,175,100 | 3/1916 | Werner | 403/358 |
| 1,637,944 | 8/1927 | Keller | 403/337 X |
| 2,332,270 | 10/1943 | Shaw | 403/358 |
| 2,568,414 | 10/1951 | Russ | 285/414 X |
| 2,768,847 | 10/1965 | Peyrin et al. | 285/415 X |
| 3,016,635 | 1/1962 | Aston | 403/337 X |
| 4,235,581 | 11/1980 | Anders | 425/378 R |
| 4,417,855 | 11/1983 | Jepsen | 403/356 X |

FOREIGN PATENT DOCUMENTS

| | | |
|---|---|---|
| 2500883 | 7/1976 | Fed. Rep. of Germany . |
| 688307 | 3/1965 | Italy ................... 285/415 |

Primary Examiner—Dave W. Arola
Attorney, Agent, or Firm—Schwartz, Jeffery Schwaab, Mack, Blumenthal & Evans

[57] ABSTRACT

A flange connection for connection in series hollow cylinder barrels forming a screw press. The cylinder barrel is formed with a groove adjacent one end thereof, and radially reduced, stepped portions of flange ring halves are positioned in the groove. Bore holes are formed at the abutment line between the flange ring halves and the external surface of the barrel, and pins are inserted in the bore holes. In this manner, radial, axial and rotative movement of the ring half is prevented, without the need for welding or otherwise permanently securing the connection.

4 Claims, 2 Drawing Figures

CYLINDER OR BARREL FLANGE CONNECTION

BACKGROUND OF THE INVENTION

The present invention relates to a cylinder or barrel flange connection for screw or worm presses. More particularly, the present invention relates to a cylinder or barrel flange connection for presses which extract liquid from solid-liquid mixtures or which are used for plasticizing and homogenizing plastics materials or rubber.

DISCUSSION OF PRIOR ART

In German Offenlegungsschrift No. 2 500 883, there is disclosed a barrel flange connection, wherein ring flanges are welded to the respective ends of the barrel. This welding is a time-consuming process which is, in itself, disadvantageous, especially since it may give rise to thermal stressing of the barrel ends and may lead to material distortion or deformation. Moreover, the greatest disadvantage of such a connection is that it is impossible to release the connection without destroying the weld seam.

OBJECTS OF THE INVENTION

The present invention seeks to provide a barrel flange connection which requires no welding. More particularly, the present invention seeks to provide ring flanges on the end of a barrel so that it is possible to connect a further, similarly shaped, barrel end thereto in a simple manner while simultaneously ensuring that the flange ring is disposed on the end of the barrel in a non-rotational manner but can be easily detached therefrom. If the flange connection is easily disconnectable, individual barrel portions, for example, damaged portions, can be rapidly replaced.

SUMMARY OF THE INVENTION

According to the present invention, there is provided a flange connection for connecting in series a hollow cylinder or barrel portion of a screw press utilised for removing liquid from liquid-solid mixtures or for plasticizing and homogenizing thermoplastics material and rubber to a second, identical barrel portion. Each barrel portion comprises an external surface, an internal surface and a first end region terminating in an end face. An annular groove is formed in said external surface in said end region but spaced from said end face. Flange ring means are engageable in said annular groove, said flange ring means being axially centrally divided into two ring halves, each having an internal surface, an external surface and an end face. The internal surface is stepped to provide a first reduced diameter portion of the ring half and a second portion of larger diameter than the first portion, said reduced diameter portion of each ring half engaging, in an undercut manner, in the groove in said cylinder or barrel portion. The second portion of the internal surface of each flange ring half abuts the external surface of the barrel or cylinder between the groove and end face. At least two axially extending blind bores are provided in the end face of each said flange ring half such that the diameter of each blind bore lies along the line of abutment of the external surface of the barrel portion and the second portion of the internal surface of the flange ring half, with barrel pins being in the blind bores.

In such an arrangement, a flange connection is provided by the insertion of the barrel pins into the blind bores, and such flange connection retains the flange rings mounted on the end of the barrel and permits them to be rapidly connected to a similar flange ring. Moreover, the flange rings are mounted on the ends of the barrel so as to be completely non-rotational without there being any need for welding or screw-connections. This is because the blind bore is centrally provided in the parting or abutment line between the barrel and the flange ring.

The provision of a stepped portion or ring on the internal surface of the flange ring which engages, in an annular groove formed in the end region of the barrel, ensures that the flange screws cause large, axial, tensional forces to be applied to the flange rings which, in turn, act on the flange seal.

The axial division of the flange ring is essential for permitting rapid assembly of the flange connection. This is because the flange ring halves can be pushed in front of one another into the annular groove in the barrel. They are then locked onto the end of the barrel by means of the barrel pins.

To prevent the flange ring halves from becoming detached from the end of the barrel, at least two barrel pins must be used for each flange ring half, one pin being disposed on each side of the imaginary, radial, vertically extending, central parting line of the flange ring half. Such a feature is necessary in order to guarantee adequate under-cutting for supporting the retention of the flange ring half. If, for example, only one pin were provided in a bore in the parting line, the flange ring half could easily be extracted from the barrel pin in a radially outwardly direction.

The provision of at least two barrel pins in the parting line is also necessary to prevent the flange ring halves from being extracted from, and rotating on, the barrel or cylinder.

Preferably, the spacing between the annular groove and the end face of the barrel corresponds to about half the axial thickness of the flange ring.

BRIEF DESCRIPTION OF THE DRAWINGS

One embodiment of the present invention will be further described, by way of example, with reference to the accompanying drawing, in which.

DESCRIPTION OF PREFERRED EMBODIMENT

Figure 2:
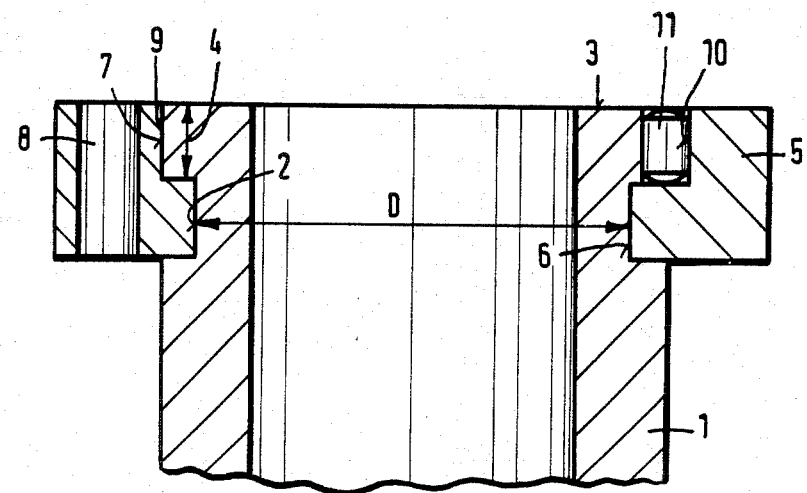
FIG. 2 is a longitudinal sectional view taken along the line II—II of FIG. 1.
Figure 1:
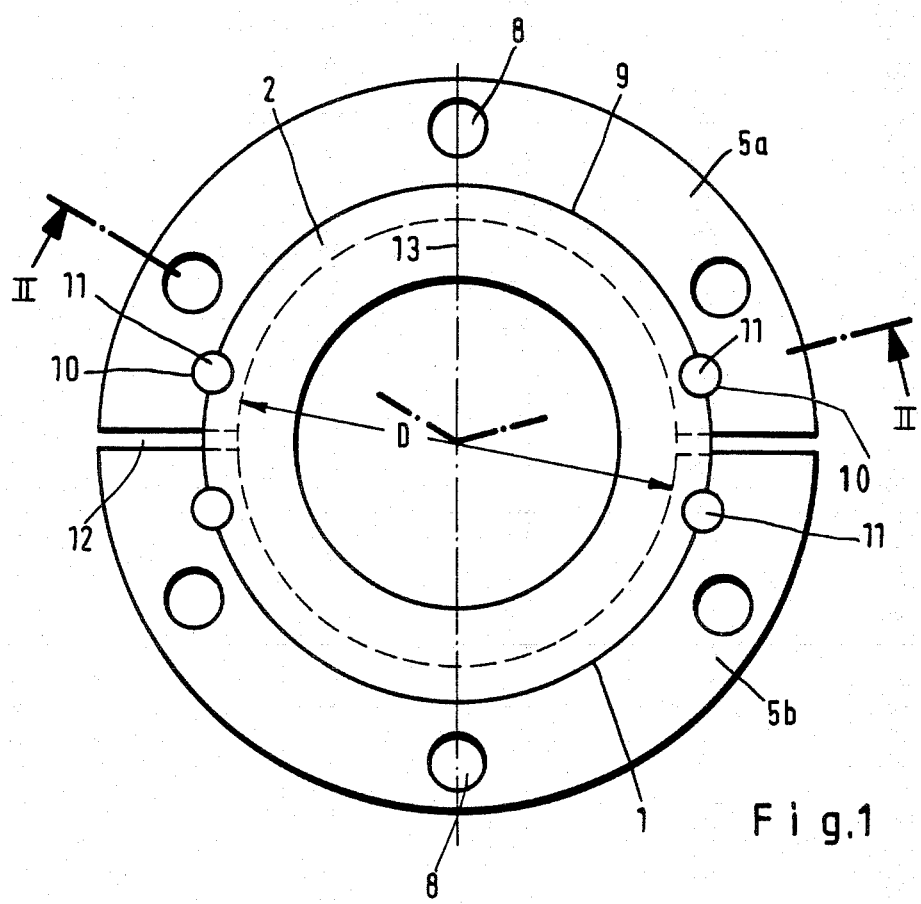
FIG. 1 is a cross-sectional view through a barrel connection in accordance with the present invention.

In FIG. 1, there is shown a barrel or cylinder 1 of a worm or screw press which has an annular groove 2 formed therein, which groove is spaced a distance 4 from the end 3 of the barrel 1.

A flange ring 5, comprised of two half-rings 5a and 5b, is inserted into the annular groove 2. The flange ring 5 is provided either with a step portion or has a stepped ring 6 formed thereon, the portion 6 having the same axial width as the annular groove 2 and having an internal diameter D. The portion 6 engages, in the groove so that the axial width of the flange ring from its end to the step portion is equal to the spacing 4. The internal surface of the ring 5 or the unstepped portion thereof is in abutment at 9 with the external surface of the barrel 1.

Bores 8 for receiving screws for connecting two flanges together are formed in the flange ring halves 5a and 5b. Bores 10 for receiving barrel pins 11 are formed in the circumferential dividing or abutment line 9 between the flange ring 5 and the barrel 1.

The flange ring halves 5a and 5b are inserted into the annular groove 2 radially. The barrel pins 11 are then inserted into the blind bores 10. By so doing, the two flange ring halves 5a and 5b are firmly connected to the barrel 1 without necessitating welding. Moreover, the ring halves are radially locked in the annular groove 2 in a manner which ensures that they cannot rotate while they are easily detachable at any time simply by removing the pins.

In order to secure each flange ring half 5a or 5b in the annular groove 2, at least two blind bores 10 are required in which corresponding barrel pins 11 are inserted. The bores 10 are preferably disposed in the region of the parting line 12 between the two flange ring halves 5a and 5b.

Depending upon the type of flange connection desired, more than two blind bores 10 may be provided in the region of the circumferential dividing or abutment line 9. Half of such blind bores 10 are formed in the flange ring half, and the other half are formed in the end region 3 of the barrel 1.

At least one blind bore 10, and its associated barrel pin 11, must be provided on each side of a radial center line 13 of the barrel to prevent the flange ring halves 5a or 5b from becoming detached from the barrel 1. The greatest degree of retention is achieved by locating the pins 11 in the vicinity of the parting line 12 between the two flange ring halves 5a and 5b.

A central thread may be provided in the barrel pins 11, into which a screw is inserted or tapped. This facilitates extraction of the pins if, for any reason, it is desired to dismantle or release the flange connection.

We claim:

1. A flange connection adapted to connect in series hollow cylinder barrels, comprising
   (a) a barrel having an external surface, an internal surface, and a first end region terminating in an end face, an annular groove being formed in said external surface in said end region but spaced from said end face, said barrel having a radial center line;
   (b) flange ring means engageable in said annular groove, said flange ring means being axially centrally divided into two ring halves, each of which has an internal surface, an external surface and an end face, said internal surface being stepped to provide a first reduced diameter portion and a second portion of larger diameter than said first portion; said second portion extending to the end face of said flange ring means said reduced diameter portion of each said ring half engaging said groove in said barrel and said second portion abutting the external surface of said barrel between said groove and said end face of said bores so that said end faces form a line of abutment, the adjacent ends of said ring halves being spaced to form a parting line;
   (c) at least two axially extending blind bores formed in each said end face of said flange ring halves and corresponding blind bores formed in the end face of said barrel, the blind bores lying within the line of abutment of said external surface of said barrel portion and said second portion of said internal surface of said flange ring half, at least one bore in each flange ring half being on each side of said radial plane, and
   (d) barrel pins positioned in said blind bores.

2. A barrel flange connection as recited in claim 1, in which said annular groove has a rectangular cross-section.

3. A barrel flange connection as recited in claim 1, in which the spacing between said annular groove and said end face of said barrel corresponds to about half the axial thickness of said flange ring.

4. A barrel flange connection as recited in claim 1, in which the bores located on each side of the radial center line of said barrel are relatively adjacent the parting line between the flange ring halves.

* * * * *